United States Patent [19]

Powers et al.

[11] 4,307,138
[45] Dec. 22, 1981

[54] SINTERED ION-CONDUCTIVE COMPOSITE ELECTROLYTE OF BETA-ALUMINA AND BETA″-ALUMINA

[75] Inventors: Robert W. Powers, Schenectady; John C. Bielawski, Ballston Lake, both of N.Y.

[73] Assignee: General Electric Company, Schenectady, N.Y.

[21] Appl. No.: 152,612

[22] Filed: May 23, 1980

Related U.S. Application Data

[63] Continuation-in-part of Ser. No. 32,114, Apr. 23, 1979, abandoned.

[51] Int. Cl.³ .................... B65D 1/00; H01M 6/18
[52] U.S. Cl. ........................... 428/35; 428/469; 428/472; 429/193; 204/14 N
[58] Field of Search ................ 428/35, 469, 472

[56] References Cited

U.S. PATENT DOCUMENTS

| | | | |
|---|---|---|---|
| 3,896,018 | 7/1975 | Powers et al. | 429/193 X |
| 3,950,463 | 4/1976 | Jones | 429/193 X |
| 4,013,477 | 3/1977 | Jatkar et al. | 429/193 X |
| 4,117,056 | 9/1978 | Jones | 429/193 X |
| 4,138,455 | 2/1979 | Shaikh et al. | 429/193X |
| 4,197,171 | 4/1980 | Dunn | 428/469 X |

Primary Examiner—P. Ives
Attorney, Agent, or Firm—Jane M. Binkowski; James C. Davis, Jr.; Joseph T. Cohen

[57] ABSTRACT

A composite beta, mainly beta″-alumina article is described which comprises a first layer of beta-alumina, a second layer of mainly beta″-alumina adhering securely to the first layer, and the first layer consisting of 1 to 15 percent thickness of the total thickness of the article. A method is also described for producing such composite articles.

3 Claims, 1 Drawing Figure

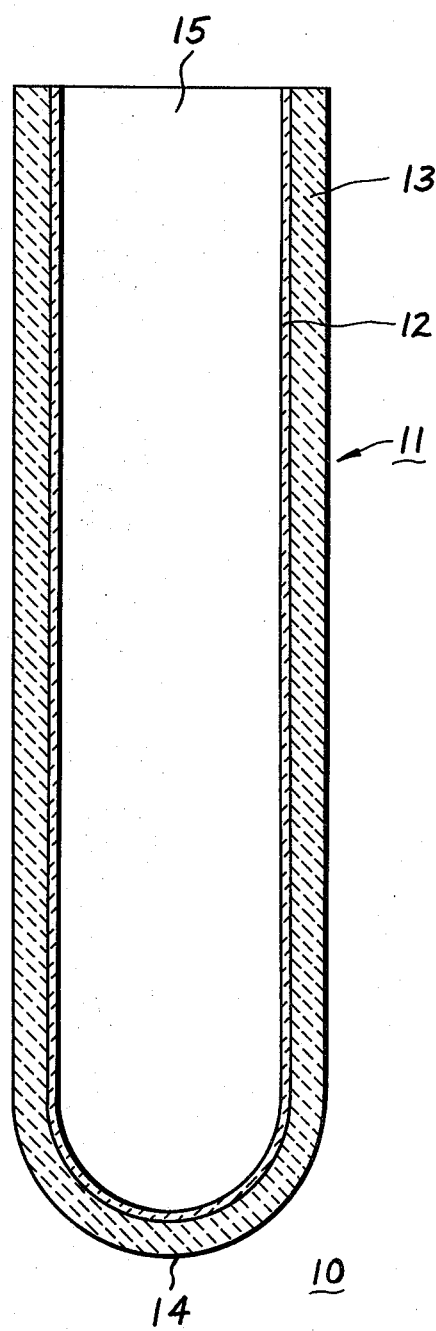

SINTERED ION-CONDUCTIVE COMPOSITE ELECTROLYTE OF BETA-ALUMINA AND BETA"-ALUMINA

This is a continuation-in-part of U.S. Patent Application Ser. No. 032,114 filed Apr. 23, 1979, now abandoned these applications being assigned to a common assignee.

The present invention relates generally to composite articles and to a method of producing such a composite article and is more particularly concerned with composite beta, mainly beta"-alumina articles having good electrical and structural characteristics, and a method of producing such a composite article.

Beta-alumina and mainly beta"-alumina articles are useful as solid electrolytes in electrical energy storage devices in a variety of combinations of electrode materials useful over a broad range of operating temperature conditions. For example, a high-energy battery can employ an anode of sodium and a cathode of sulfur in which both the sodium and sulfur are in the molten state at operating temperature and are in contact with and separated by an electrolyte of a thin, plate-like article or of a closed end tube of sodium beta-alumina or mainly sodium beta"-alumina. Such a battery is shown, for example, in U.S. Pat. No. 3,946,751 employing a closed end tube of sodium beta-alumina.

In U.S. Pat. No. 4,073,711, there is described a method of producing lithiated beta-alumina articles which includes electrophoretically codepositing such material onto a mandrel from two powders, drying the deposited material, and sintering the dried material.

In U.S. Pat. No. 3,719,531-Dzieciuch, et al entitled "Cationically-Conductive Ceramics, Their Preparation and Use", there is described sodium beta-alumina with a small weight percent of lithia which material is produced by isotatic pressing and sintering.

In U.S. Pat. No. 3,900,381, there is described a method of forming beta-alumina articles which includes electrophoretically depositing such material on a mandrel, drying the deposited material, and sintering the dried material.

In U.S. Pat. No. 3,896,018, there is described a method of forming beta-alumina articles which includes further adding a small weight percent of aluminum stearate to the specific suspension.

In U.S. Pat. No. 3,881,661, there is described a method of preparing an electrophoretic suspension of beta-alumina particles including vibromilling water free beta-alumina particles of a diameter larger than 20 microns in an organic fluid having a dielectric constant at 25° C. of from 12 to 24 with zirconia grinding media. The resulting suspension is useful for forming beta-alumina articles by electrophoretic deposition.

In U.S. Pat. No. 3,896,019, there is described a method of forming beta-alumina articles which includes sintering beta-alumina greenware between 1650° and 1825° C. in a preheated oxygen oxidizing atmosphere at a controlled passage rate from one-half to four inches per minute.

In U.S. Pat. No. 3,976,554, there is described a method of forming a beta-alumina article which includes electrophoretically depositing such material on a mandrel, exposing the deposited material promptly to a continuous flow of warm air thereby drying the deposited material, and sintering the dried material.

In U.S. Pat. No. 3,972,480, there is described a method of preparing a suspension of additive free beta-alumina particles which includes vibromilling water free beta-alumina particles with beta-alumina grinding media.

In U.S. patent application Ser. No. 875,676, filed Feb. 6, 1978, now abandoned there is described a method of making continuously beta-alumina articles which includes passing beta-alumina greenware through a preheated dry oxygen atmosphere having a dew point below −80° F. flowing in a countercurrent direction to the movement of the greenware at a temperature between 1500° C. and 1825° C. at a controlled passage rate.

The above patents and application other than the one to Dzieciuch, et al are assigned to the same assignee as the present application.

As used in this application, the term beta-alumina denotes that crystal structure in which the unit cell contains two spinel-like blocks, each with four layers of oxygen atoms, counting along the c-direction, with aluminum atoms in certain interstitial positions. The unit cell has a crystallographic repeat distance along the c-axis of approximately 22 Å. Monovalent cations are mobil in the rather loosely packed planes separating the individual spinel blocks. Beta"-alumina denotes that the unit cell contains three spinel blocks and the crystallographic repeat distance is about 33 Å along the c-axis. In beta-alumina, each spinel block is rotated 180° with respect to an adjacent one while in beta"-alumina, the rotation is 120°. In other words, the loosely packed conducting plane is also a mirror plane in plain beta-alumina but not in beta"-alumina. As used in this application, the term mainly beta"-alumina denotes material containing more than 50 percent of beta"-alumina as defined by X-ray diffraction.

The primary object of our invention is to provide an improved composite beta, mainly beta"-alumina article which can be employed as a solid ion-conductive electrolyte in energy storage devices.

In accordance with one aspect of our invention, a composite beta, mainly beta"-alumina article includes a first layer of beta-alumina, a second layer of mainly beta"-alumina adhering securly to the first layer, and the first layer consisting of 1 to 15 percent of the thickness of the total thickness of the article.

These and various other objects, features and advantages of the invention will be better understood from the following description taken in connection with the accompanying drawing in which:

The single FIGURE of the drawing is a sectional view of a composite beta, mainly beta"-alumina article made in accordance with our invention.

In the single FIGURE of the drawing, there is shown generally at 10, a composite article embodying our invention which is shown in the form of a tube 11. The tube has a first inner layer of beta-alumina 12. A second outer layer 13 of mainly beta"-alumina adheres securely to the first layer 12. First layer 12 consists of 1 to 15 percent of the thickness of the total thickness of tube 11. Tube 11 has a closed end 14 and an open end 15.

The composite tube of our invention is useful in tube form as the inner casing in a sodium-sulfur cell such as described in the above-identified U.S. Pat. No. 3,946,751. Such a tube, when employed in a sodium-sulfur cell, would contain sodium within tube 11 in contact with the surface of first layer 12. The outer layer 13 would be in contact with the positive electrode comprising sulfur in an electrically conductive material. Both beta-alumina and mainly beta"-alumina are useful ionic-conductive materials in such a sodium-sulfur cell. The beta-alumina has a higher bulk resistivity than mainly beta"-alumina. While the mainly beta"-alumina has lower bulk resistivity than beta-alumina, it provides the advantage of requiring less electrolyte surface with the resulting advantage of fewer or smaller cells with the same energy efficiency. However, mainly beta"-alumina exhibits polarization, that is surface resistance, usually at the mainly beta"-alumina/liquid sodium interface.

We have found that we could form a composite beta, mainly beta"-alumina article with ionic conductivity which provides the advantages of lower bulk resistivity and elimination of polarization. Our composite article imparts more desirable properties than the use of either beta-alumina or mainly beta"-alumina. Our article has the lowest bulk resistivity consistant with good microstructure and the absence of polarization.

When a mainly beta"-alumina solid electrolyte is incorporated in a cell with a negative electrode of liquid sodium such as a sodium-sulfur cell, the voltage drop for such a cell is usually much larger than can be accounted for on the basis of the resistance of the positive electrode compartment and that of the solid electrolyte. There is usually present in addition a voltage drop at the liquid sodium, mainly beta"-alumina interface which is absent in cells employing a plain beta-alumina electrolyte. The voltage drop associated with this polarization is assymetric with respect to the direction of the current flow. It is larger for the current flow direction associated with sodium oxidation. Mainly beta"-alumina is employed as an ionic conductor because of its generally lower bulk resistivity, thereby permitting use of less electrolyte surface. Beta-alumina is employed as an ionic conductor because of its absence of polarization, although it has a higher bulk resistivity.

Our composite beta, mainly beta"-alumina article employs a first layer of beta-alumina which eliminates polarization associated with mainly beta"-alumina. The second layer of mainly beta"-alumina in our article, which adheres securely to the first layer, provides the lowest bulk resistivity consistent with good microstructure. Thus, our composite article exhibits the advantages of both beta-alumina and mainly beta"-alumina, while it eliminates the disadvantages of both of these materials. Additionally, the first layer of beta-alumina consists of 1 to 15 percent of the total thickness of the article. We have found that this percentage eliminates the polarity associated with mainly beta"-alumina while allowing us advantageously to secure low bulk resistivity from the mainly beta"-alumina.

We found that we could form the composite beta, mainly beta"-alumina article of our invention by an electrophoretic codeposition of beta-alumina layer followed by the electrophoretic codeposition of the mainly beta"-alumina layer thereon, whereby the second layer of mainly beta"-alumina adheres securely to the first layer. We found that the first layer of beta-alumina should consist of 1 to 15 percent of the total thickness of the article, which thickness eliminates polarization. In the above U.S. Pat. No. 4,073,711, there is described a method of producing a lithiated beta-alumina article which employs an electrophoretic codepositing of the particles from an organic suspension under specific conditions.

In our method of producing a composite article, we provide a first organic suspension of beta-alumina particles and of soda-alumina particles with a soda content from 14 to 30 weight percent. We provide a second organic suspension of mainly beta"-alumina particles and of soda-alumina particles with a soda content from 14 to 30 weight percent. We provide lithia in one or both of the above types of particles in each suspension so that the resulting layers each contain 0.1 to 1.0 percent lithia. The majority of the particles of both suspensions have a diameter in the range of 1 to 2 microns with the particles suspended in an organic liquid, such as n-amyl alcohol, having a dielectric constant at 25° C. from 12 to 24. The particles of each suspension are electrophoretically codeposited from the respective separate suspension onto a charged mandrel in a D.C. Field of from 100 to 10,000 volts per centimeter to form the respective beta-alumina and beta"-alumina layers. The first beta-alumina layer is 1 to 15% of the total thickness of the composite article.

After the beta-alumina from the first suspension is deposited on the mandrel, the mandrel is then transferred quickly to the second suspension from which a thicker layer of mainly beta"-alumina is deposited as a second layer on the first layer of beta-alumina. After deposition, the composite tube is stored in a low humidity chamber to facilitate subsequent removal from the mandrel. The organic liquid is evaporated from the deposited tube using a current of warm air. After removing the tube from the mandrel, the tube is fired in a temperature range from 1500° to 1775° C. The tubes can be fired as described in U.S. Pat. No. 3,896,019. To effect higher densification, oxygen is caused to flow through the sintering furnace countercurrent to the tube being fired as described in above U.S. patent application Ser. No. 875,676.

In our method of forming a composite article, separate organic suspensions of beta-alumina and mainly beta"-alumina were prepared. Each suspension used the electrophoretic codeposition as described in U.S. Pat. No. 4,073,711. The beta-alumina powder from the first organic suspension was ball-milled for 120 hours to increase the surface area, after which it was calcined at 1200° C. for 24 hours. After the powder had cooled to 350° C., it was transferred to an air oven at 150° C. from which it was quenched into n-amyl alcohol. The soda-alumina powder, which included beta-alumina powder, anhydrous sodium carbonate and lithium oxalate, was calcined also at 1200° C. for 24 hours, after which it was added to the first suspension. We found that a preferred first beta-alumina layer contained 9.6% $Na_2O$, 0.25% $Li_2O$, and the balance $Al_2O_3$.

The mainly beta"-alumina powder for the second organic suspension was ball-milled for 72 hours after which was calcined at 1200° C. for 24 hours. After the powder had cooled to 350° C., it was transferred to an air oven at 150° C. from which it was quenched into n-amyl alcohol. The soda-alumina powder, which included mainly beta"-alumina powder, anhydrous sodium carbonate, and lithium oxalate, was calcined also at 1200° C. for 24 hours, after which it was added to the first suspension. We found that a preferred second mainly beta"alumina layer content was 9.6% $Na_2O$, 0.75% $Li_2O$, and the balance $Al_2O_3$.

In the preparation of both the beta-alumina and mainly beta"-alumina suspension, the n-amyl alcohol was previously dried by slow passage through a column of molecular sieves. A small amount of aluminum stearate is added to each suspension for the purpose of producing greenware and resulting articles with smoother surfaces as described in U.S. Pat. No. 3,896,018. A beta-alumina grinding media is added to each suspension and the suspensions are each vibratory milled for 24 hours in order to charge the particles preparatory to electrophoretic forming. The advantages of vibrating milling, and such vibratory milling with beta-alumina grinding media, are discussed in U.S. Pat. Nos. 3,881,661 and 3,972,480.

Previous forming of beta-alumina and lithiated beta-alumina articles, including tubes, are discussed in U.S. Pat. Nos. 3,900,381 and 4,073,711.

An example of composite beta, mainly beta''-alumina articles and a method of producing such articles made in accordance with our invention is set forth below:

EXAMPLE I

A suspension of beta-alumina powder was prepared. 133.1 grams of Alcoa XB-2 beta-alumina powder was ball milled for 120 hours to increase the surface area. The powder was then calcined at 1200° C. for 24 hours. When the powder had cooled to 350° C., it was transferred to an air oven at 150° C. from which it was quenched into 300 cc of n-amyl alcohol. The n-amyl alcohol had been previously dried by slow passage through a column of Linde type 4A molecular sieves. Soda-alumina powder was prepared from a mixture consisting of 709.1 grams of milled Alcox XB-2 beta-alumina powder, 191.1 grams of anhydrous soda carbonate, and 55.4 grams of lithium oxalate. This powder was then calcined at 1200° C. for 24 hours. When the soda-alumina powder had cooled to 350° C., it was transferred to an air oven at 150° C., from which it was quenched into the n-amyl alcohol containing the beta-alumina powder. 0.15 grams of aluminum stearate was added to the n-amyl alcohol. 900 grams of beta-alumina grinding media was then added to the suspension. The suspension of the beta-alumina powder and the soda-alumina powder and the n-amyl alcohol containing the aluminum stearate was vibratory-milled for 24 hours in order to charge the particles preparatory to electrophoretic forming.

A second suspension of mainly beta''-alumina was similarly prepared. 131.2 grams of Alcoa mainly beta''-alumina powder was ball-milled for 72 hours, after which was calcined at 1200° C. for 24 hours. When the mainly beta''-alumina powder had cooled to 350° C., it was transferred to an air oven at 150° C. from which it was quenched into 300 cc of n-amyl alcohol and dried was above described. Soda-alumina was prepared from a mixture of 203.0 grams of milled Alcoa mainly beta''-alumina powder, 55.0 grams of anhydrous soda carbonate and 46.2 grams of lithium oxalate. The soda-alumina powder was calcined at 1200° C. for 24 hours. 0.15 grams of aluminum stearate was added to the n-amyl alcohol. 900 grams of beta-alumina grinding media was also added to the n-amyl alcohol. The suspension of mainly beta-alumina powder and soda-alumina powder in the n-amyl alcohol with aluminum stearate was vibratory milled for 24 hours in order to charge the particles preparatory to electrophoretic forming.

The relative quantities of beta-alumina and soda-alumina for the first suspension were such to produce greenware and a resulting first layer containing 9.6% $Na_2O$, 0.25% $Li_2O$ and the balance $Al_2O_3$. The proportions of mainly beta''-alumina powder and soda-alumina powder for the second suspension were such to yield beta-alumina greenware and a resulting second layer with 9.6% $Na_2O$, 0.75% $Li_2O$ and the balance $Al_2O_3$.

Six composite beta, mainly beta''-alumina articles in the form of closed-end tubes were formed from the above suspensions. Each tube was 10 centimeters long, 1 centimeter inner diameter and 0.1 centimeter wall thickness. These composite tubes were electrophoretically formed. Each first beta-alumina layer was deposited from the first suspension onto an electrically charged mandrel using deposition times of 10 to 15 seconds with a cell voltage of 500 volts to form a first beta-alumina layer comprising from 1 to 15% of the total wall thickness of the subsequent composite article. The mandrel was then quickly transferred to the second suspension and the remainder of the composite article was electrophoretically formed from this second suspension. After each tube had been deposited on its respective mandrel, it was stored in a low humidity chamber to facilitate subsequent removal from the mandrel. the n-amyl alcohol was evaporated from each deposited tube using a current of warm air. Each tube was removed from its respective mandrel. The tubes were then fired by moving each tube through a sintering furnace at a traverse rate of 0.5 in. per min.

Two tubes fired at a temperature of 1575° C. while two tubes were fired at 1600° C. and two tubes were fired at 1625° C. During the sintering of the tubes, oxygen was caused to flow through the sintering tube of the furnace in a countercurrent direction to the movement of the tubes.

Table I, which is set forth below, shows the superior performance of the composite tubes of our invention. Tube 1 is a beta''-alumina tube. Tube 2 is a beta-alumina tube. Tube 3 is a composite tube made in accordance with our invention which has a first inner layer of beta-alumina with a wall thickness of 10% of the total wall thickness of the tube, and the second outer layer is made of mainly beta''-alumina. Tube 4 is a composite tube made in accordance with our invention with the first inner layer of beta-alumina, with a wall thickness of 15% of the total wall thickness and the second outer layer of mainly beta''-alumina.

Tube 1 contains 9.6% of $Na_2O$ and 0.75% $Li_2O$. The balance of the composition of tube 1 as well as the balance of the composition of tubes 2-4 is $Al_2O_3$. Tube 2 contains 9.6% $Na_2O$ and 0.25% $Li_2O$. Tubes 3 and 4 each contain 9.6% $Na_2O$ and 0.25% $Li_2O$ in the beta-alumina layer, and 9.6% $Na_2O$ and 0.75% $Li_2O$ in the mainly beta''-alumina layer. As mentioned above, the difference between tubes 3 and 4 is that tube 3 has a thickness of 10% while tube 4 has a thickness of 15% of the total thickness of the tube.

Polarization data which is shown in Table I is indicated by comparative values of cell resistance computed from the absolute value of the difference between the measured and open cell voltages divided by the cell current.

TABLE I

| | Polarization Data | | | |
| | Resistance-Na Filling | | Resistance-Na/S Cell | |
| Tube No. | Charge (in)Ω | Discharge (out)Ω | Charge Ω | Discharge Ω |
| --- | --- | --- | --- | --- |
| 1 | .15 | .50 | .15 | .27 |
| 2 | .14 | — | .15 | .15 |
| 3 | .09 | .09 | — | — |
| 4 | .075 | .075 | — | — |

As shown in above Table I, the cell resistance of tube 1 is less for sodium reduction from sodium nitrate melts or analogously for charging in sodium-sulfur cells. Results obtained in sodium nitrate melts during electrolytic filling with sodium correlate well with those in sodium-sulfur cells and consequently are useful for first stage testing. The cell resistance of tube 2 is actually less than the cell resistance of tube 1 although the bulk resistivity of tube 2 is over twice that of tube 1 at 300° C. The resistance of cell 2 is symmetric with respect to current direction. The cell resistance of tubes 3 and 4 is less for sodium filling than either tubes 1 or 2. The above Table does not contain data for sodium-sulfur cells for tubes 3 and 4.

While other modifications of the invention and variations thereof which may be employed within the scope of the invention have not been described, the invention is intended to include such as may be embraced within the following claims.

What we claim as new and desire to secure by Letters Patent of the United States is:

1. A sintered ion-conductive composite electrolyte comprising a first layer of beta-alumina, a second layer of mainly beta"-alumina integrally adhered to the first layer and at least substantially coextensive therewith, and the first layer consisting of 1 to 15 percent of the total thickness of the electrolyte.

2. A composite electrolyte as in claim 1, in which the electrolyte is a tube with an open end and a closed end, the first layer of beta-alumina layer is the inner layer of the tube, and the second layer of mainly beta"-alumina is the outer layer of the tube.

3. A composite electrolyte as in claim 1, in which the electrolyte is a tube with an open end and a closed end, the first layer of beta-alumina is the outer layer of the tube, and the second layer of mainly beta"-alumina is the inner layer of the tube.

* * * * *